United States Patent [19]

Gerdt et al.

[11] Patent Number: 5,764,880
[45] Date of Patent: Jun. 9, 1998

[54] METHOD AND SYSTEM FOR REBUILDING LOG-STRUCTURED ARRAYS

[75] Inventors: Steven Gerdt; M. Jaishankar Menon; Dung Kim Nguyen, all of San Jose, Calif.

[73] Assignee: International Business Machines Corporation, Armonk, N.Y.

[21] Appl. No.: 711,611

[22] Filed: Sep. 10, 1996

[51] Int. Cl.[6] .................................................. G06F 11/00
[52] U.S. Cl. ............................ 395/182.05; 395/182.06
[58] Field of Search ...................... 395/182.03, 182.04, 395/182.05, 182.06, 182.07, 441, 439, 622, 618, 182.13; 711/114; 707/207

[56] References Cited

U.S. PATENT DOCUMENTS

| | | | |
|---|---|---|---|
| 5,088,081 | 2/1992 | Farr | 369/54 |
| 5,258,984 | 11/1993 | Menon et al. | 395/182.05 |
| 5,278,838 | 1/1994 | Ng et al. | 371/10.1 |
| 5,390,187 | 2/1995 | Stallmo | 395/182.05 |
| 5,488,701 | 1/1996 | Brady et al. | 395/182.04 |
| 5,502,836 | 3/1996 | Hale et al. | 395/182.01 |
| 5,530,850 | 6/1996 | Ford et al. | 395/182.04 |
| 5,537,534 | 7/1996 | Voigt et al. | 395/182.04 |
| 5,572,661 | 11/1996 | Jacobson | 395/182.05 |
| 5,574,851 | 11/1996 | Rathunde | 395/182.05 |
| 5,574,882 | 11/1996 | Menon et al. | 395/182.03 |
| 5,581,724 | 12/1996 | Belsan et al. | 395/182.04 |
| 5,596,709 | 1/1997 | Bond et al. | 395/182.05 |
| 5,615,353 | 3/1997 | Jacobson et al. | 395/441 |

OTHER PUBLICATIONS

ACM Transactions on Computer Systems, vol. 10, No. 1, Feb. 1992, pp. 26–52, *Rosenblum and Ousterhout, The Design and Implementation of a Log-Structured File System.*

*Primary Examiner*—Joseph Palys
*Attorney, Agent, or Firm*—Esther E. Klein; Antony P. Ng; Andrew J. Dillon

[57] ABSTRACT

A method for rebuilding contents of a malfunctioned direct access storage device within a log-structured array is disclosed. In accordance with the method and system of the present invention, each direct access storage device within a log-structured array is divided into multiple segment-columns, and each corresponding segment-column from each direct access storage device within the log-structured array forms a segment. A segment is first located within the direct access storage devices. A determination is made as to whether or not the segment is empty. In response to a determination that the segment is empty, a pointer is moved within a segment-column mapping table from pointing to a segment-column in the malfunctioned direct access storage device to point to a segment-column in a spare direct access storage device of the segment. In response to a determination that the segment is not empty, rebuilding contents of the segment-column in the malfunctioned direct access storage device to the segment-column in the spare direct access storage device, and moving the pointer within the segment-column mapping table from pointing to the segment-column in the malfunctioned direct access storage device to point to the segment-column in the spare direct access storage device of the segment. The process then returns to the determination step until all segment-columns within the malfunctioned direct access storage device are rebuilt.

6 Claims, 4 Drawing Sheets

METHOD AND SYSTEM FOR REBUILDING LOG-STRUCTURED ARRAYS

BACKGROUND OF THE INVENTION

1. Technical Field

The present invention relates to a method and system for data processing in general and, in particular, to a method and system for rebuilding the contents of a malfunctioned direct access storage device. Still more particularly, the present invention relates to a method and system for rebuilding the contents of a malfunctioned direct access storage device within a log-structured array.

2. Description of the Prior Art

A data storage system having multiple direct access storage devices (DASDs) may store data and other information in an arrangement called a log-structured file, which provides what is known as a log-structured array (LSA). Under the LSA, data are stored among multiple DASDs and any changes to these data are temporarily stored in a write buffer, also known as a memory segment. When the write buffer is filled, the changed data that were stored in the write buffer are sequentially recorded back to the DASDs. Thus, the data are stored in a sequential structure that can be characterized as an infinite tape or a log. Such log eliminates most disk-seek operations during data recording and retrieval. The data that are recorded back to the DASDs includes attributes, index blocks, directories, and other information utilized by the data storage system for data operation management.

Under the LSA environment, an LSA controller typically emulates one or more logical devices such that the physical nature of the DASDs is transparent to the operating system and any other application programs in the host computer. In other words, all read and write commands generated by the operating system and application programs are received and interpreted by the LSA controller so that a reference to a data file at a logical device is automatically mapped onto an appropriate disk platter and track-sector location of an appropriate physical device.

In addition, the recording area of each DASD is assigned to several consecutive physical areas called segment-columns. Typically, a physical segment-column of an LSA is configured to be the same size as a physical disk cylinder, which comprises all of the same-position tracks on all the platters within a DASD. As a result, a DASD within an LSA typically includes as many segment-columns as there are tracks on a single disk platter. Furthermore, the collection of disk-recording area comprising corresponding segment-columns from each of the DASDs within the LSA forms what is referred to as a segment.

One segment-column per segment is typically utilized to store parity information that is produced by a logical XOR operation on data stored in the remaining segment-columns of the same segment. For improved performance, the segment-columns containing the parity information are not all stored in the same DASD, but are distributed among various DASDs within the LSA. This ensures that a data rebuild can be performed accurately in the event of a DASD failure.

When a disk fails, the contents of the malfunctioned DASD are completely rebuilt and written onto a spare DASD. For each segment, all surviving segment-columns are read and XORed together to produce the data that is to be written to the spare DASD. Because of the large number of segment-columns involved, the rebuild process could be quite timeconsuming. Consequently, it would be desirable to provide an improved method for rebuilding the contents of a malfunctioned DASD within the log-structured array in a more efficient manner.

SUMMARY OF THE INVENTION

In view of the foregoing, it is therefore an object of the present invention to provide an improved method and system for data processing.

It is another object of the present invention to provide an improved method and system for rebuilding contents of a malfunctioned direct access storage device.

It is yet another object of the present invention to provide an improved method and system for rebuilding contents of a malfunctioned direct access storage device within a log-structured array.

In accordance with the method and system of the present invention, each direct access storage device within a log-structured array is divided into multiple segment-columns, and each corresponding segment-column from each direct access storage device within the log-structured array forms a segment. A segment is first located within the direct access storage devices. A determination is made as to whether or not the segment is empty. In response to a determination that the segment is empty, a pointer is moved within a segment-column mapping table from pointing to a segment-column in the malfunctioned direct access storage device to point to a segment-column in a spare direct access storage device of the segment. In response to a determination that the segment is not empty, rebuilding contents of the segment-column in the malfunctioned direct access storage device to the segment-column in the spare direct access storage device, and moving the pointer within the segment-column mapping table from pointing to the segment-column in the malfunctioned direct access storage device to point to the segment-column in the spare direct access storage device of the segment. The process then returns to the determination step until all segment-columns within the malfunctioned direct access storage device are rebuilt.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF PREFERRED EMBODIMENT

The present invention may be applicable to a variety of computers under a number of different operating systems. The computer may be, for example, a personal computer, a mini-computer, or a mainframe computer. In addition, the computer may be a stand-alone system or part of a network such as a local-area network (LAN) or a wide-area network (WAN). For the purpose of illustration, a preferred embodiment of the present invention, as described below, is implemented on a mini-computer, such as the RS/6000™ series manufactured by International Business Machines Corporation.

Figure 1:
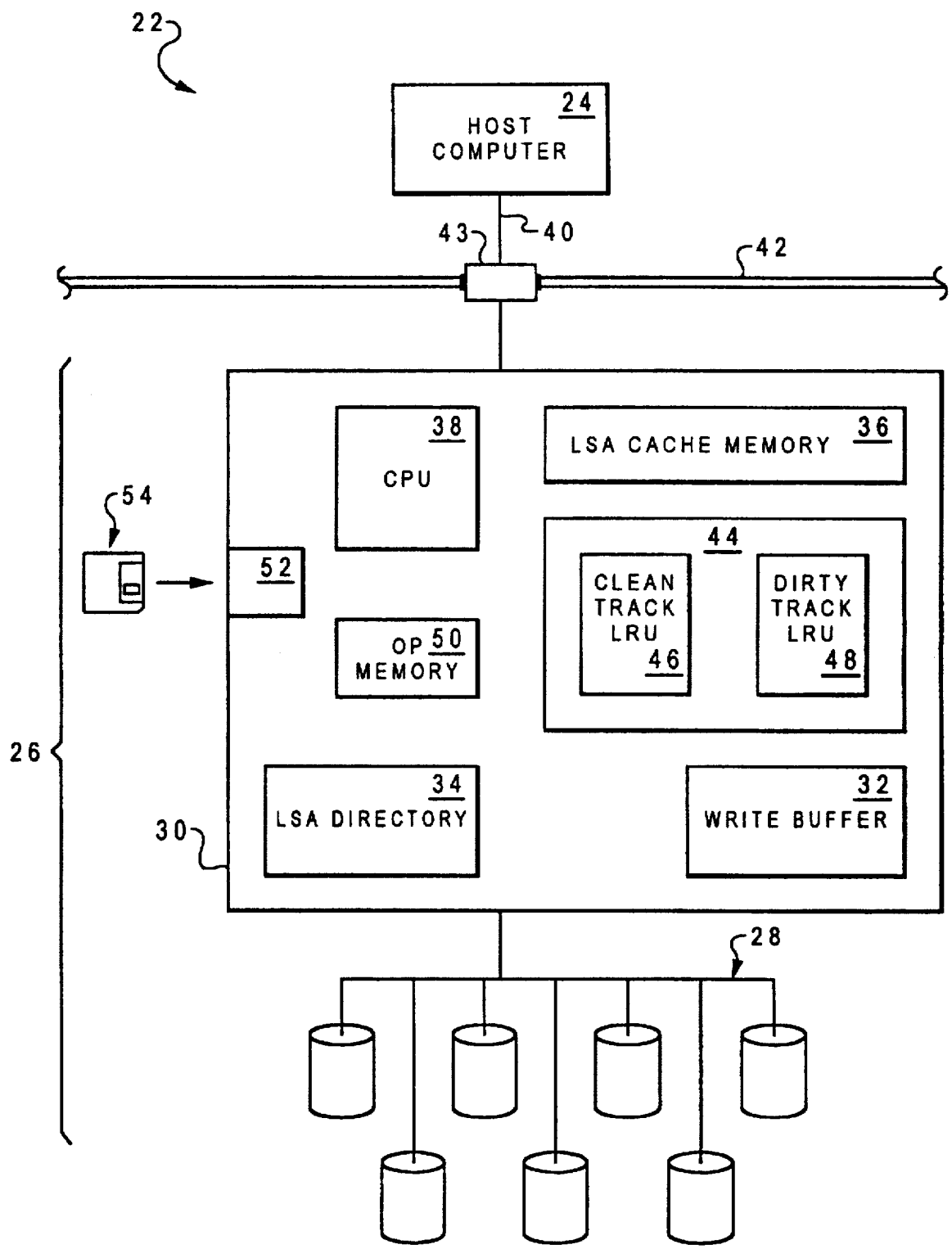
FIG. 1 is a block diagram of a computer system that includes a log-structured array and an array controller constructed in accordance with a preferred embodiment of the present invention.

Referring now to the drawings and in particular to FIG. 1, there is depicted a computer system 22 in which a host computer 24 communicates with a data storage system 26 constructed in accordance with a preferred embodiment of the present invention. Data storage system 26 includes several direct access storage devices (DASDs) 28 that store data according to a log-structured file format implemented by a logstructured array (LSA) controller 30.

LSA controller 30 communicates with host computer 24 over a data communication bus 40. Data communication bus 40 may comprise any industry-standard computer communication interface, such as the Small Computer Standard Interface (SCSI) or the like. Host computer 24 and data storage system 26 may also be connected to a network 42, such as a localarea network (LAN), via a network interface 43 to facilitate communication with other host computers or data storage systems.

LSA controller 30 includes a write buffer (or memory segment) 32 and an LSA directory 34. Data received from host computer 24 for recording into DASDs 28 may be temporarily stored in write buffer 32. LSA directory 34 contains a mapping of logical track storage locations to physical disk storage locations of DASDs 28. Further, LSA controller 30 also includes an LSA cache memory 36 having a substantially larger storage capacity than write buffer 32. LSA cache memory 36 may contain both "dirty" logical tracks (updated data received from host computer 24) and "clean" logical tracks (unmodified data same as that in DASDs 28). LSA controller 30 is operated under the control of a central processor unit (CPU) 38 to determine the time for moving data from LSA cache memory 36 to write buffer 32. For example, when a portion of LSA cache memory 36 that is occupied by "dirty" tracks exceeds a predetermined threshold, then a "dirty" track and all logically adjacent tracks are moved from LSA cache memory 36 to write buffer 32. A track is determined to be a logically adjacent track by a logical track number, as will be described further below.

Typically, write buffer 32 has a storage capacity of one segment's worth of data while LSA cache memory 36 has a storage capacity of at least twice, and often ten times or more, than that of write buffer 32. Thus, when data is sent to LSA controller 30 for storage, the data is first put in LSA cache memory 36, in which the data might remain for some time. Within LSA cache memory 36, an updated track and all logically adjacent tracks can be grouped together to be moved at the same time from LSA cache memory 36 to write buffer 32. This ensures that, if adjacent tracks are updated within some window of time proportional to the size of LSA cache memory 36, all updated tracks will still be placed contiguously on DASDs 28, and no seek affinity will be lost. After being moved to write buffer 32, all updated tracks are eventually written to DASDs 28.

LSA controller 30 looks for a sequential pattern in LSA cache memory 36 when moving data from LSA cache memory 36 to write buffer 32. For each logical track to be moved, LSA controller 30 looks for adjacent or sequential tracks. If sequential tracks are in LSA cache memory 36, then they are taken out together at the same time, even though they might have been written at different times.

In order to keep track of the contents in LSA cache memory 36, LSA controller 30 includes an LSA cache memory directory 44 having a least recently used (LRU) list 46 for "clean" logical tracks and a LRU list 48 for "dirty" logical tracks. Each of LRU lists 46 and 48 can be thought of as being arranged so that the least recently used logical track of each respective list is at the bottom of the list, while the most recently used logical track is at the top of the list. LRU lists 46, 48 are preferably doubly linked lists such that when an updated logical track is moved from LSA cache memory 36 to write buffer 32, any other updated tracks logically adjacent to the updated -track are also moved from LSA cache memory 36 to write buffer 32, regardless of where the adjacent updated tracks are in LRU lists 46 and 48.

CPU 38 within LSA controller 26 executes program instructions that are stored in an operating memory 50. These instructions may be loaded into operating memory 50 through an optional program storage reader 52. Program storage reader 52 permits a program product storage device, such as a magnetic disk 54, to be received for the purpose of reading and transferring program instructions recorded on such program product storage device to operating memory 50. In this way, the program instructions necessary for operation in accordance with a preferred embodiment of the invention can be embodied on a program product storage device such as magnetic disk 54. Other suitable forms of program product storage device includes magnetic tape, optical disk, and semiconductor memory. Alternatively, the program instructions may be transferred to operating memory 50 from network 42 via network interface 43.

Figure 2:
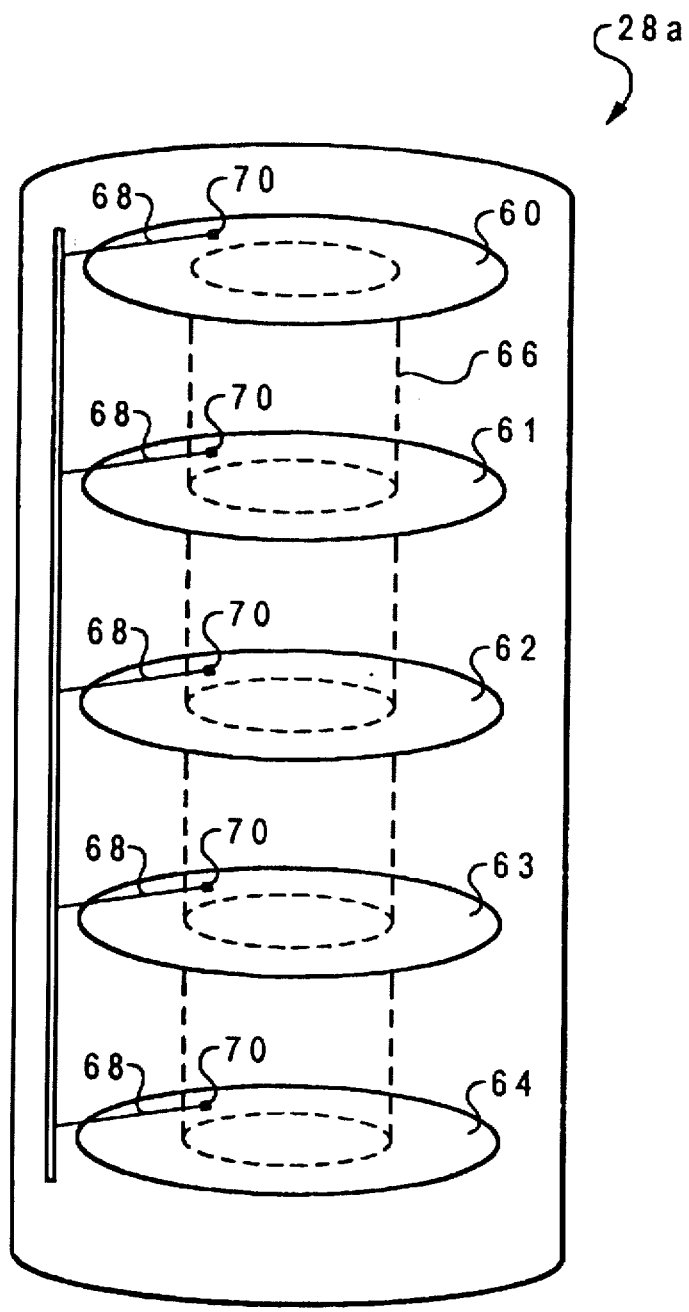
FIG. 2 is a detailed representation of one of the storage devices shown in FIG. 1.

With reference now to FIG. 2, there is represented a preferred embodiment of a single storage device of DASDs 28. It should be understood that all storage devices of DASDs 28 have a similar construction. As shown, storage device 28a has five disk platters 60, 61, 62, 63, and 64. Data is recorded in concentric tracks (or alternatively in spiral tracks) on one or both surfaces of each of five platters 60–64. Each track on a platter is comprised of a group of radial sectors, also called blocks. Each sector may contain multiple byte lengths of data, called records.

Many conventional multiple-platter DASD systems number their tracks sequentially from platter to platter within a single storage device. In other words, the first innermost track on the first platter is track 1, the first innermost track on the second platter is track 2, etc. Thus, under the fiveplatter DASD example of FIG. 2, the second innermost track on first platter 60 would be track 6, the second innermost track on second platter 61 would be track 7, the third innermost track on first platter 60 would be track 11, the third innermost track on second platter 61 would be track 12, etc.

A segment-column is defined as an arbitrary number of contiguous tracks, where tracks are numbered sequentially as described above. But, typically, it is more desirable to define a segment-column to be the same size as a physical cylinder. For example, because storage device 28a has five platters 60–64, it may be desirable to define a cylinder of five tracks to be a segment-column. Thus, the first innermost track on each of five platters 60–64 within storage device 28a forms a segment-column, the second innermost track on each of five platters 60–64 within DASD 28a forms another segment-column, the third innermost track on each of five platters 60–64 within storage device 28a forms yet another segment-column, etc. A single segment-column is graphically represented in FIG. 2 by dashed line 66 that extends across each of disk platters 60–64. As such, storage device 28a would include as many segment-columns as there are tracks on a single disk platter.

The collection of disk-recording area comprising corresponding segment-columns from each of DASDs 28 forms what is called a logical segment. Such logical segment does not extend to another set of DASDs that is also controlled by controller 30 with DASDs 28 simultaneously. Under a track-numbering scheme described above and if each storage device within DASDs 28 has five platters such that a segment-column is formed from the collection of $x^{th}$ track on each of the five platters, then a segment is formed from the collection of segment-column y from each storage device. In other words, a segment comprises all of the like-numbered segment-column from each storage device of DASDs 28 within the LSA. Thus, the first segment would comprise the collection of segment-column 1 of the first storage device, segment-column 1 of the second storage device, and so forth through the collection of segment-column 1 of the seventh storage device, for a seven-DASD configuration as shown in FIG. 1. In this way, it should be apparent that an LSA typically has as many segments as there are segment-columns in a single storage device.

Whether an LSA stores information according to a variable length format or according to a fixed block architecture, the LSA storage format of segment-columns is mapped onto the physical storage space in the DASDs so that a logical track of the LSA is stored entirely within a single segment-column mapped onto a storage device of the LSA. The size of a logical track is designed to have as many logical tracks to be stored in the same segment-column as possible.

To store data from host computer 24 into data storage system 26, LSA controller 30 maintains write buffer 32 to contain the same number of segment-columns as there are storage devices within DASDs 28, allowing for data storage and parity storage. For example, as shown in FIG. 1, DASDs 28 include seven storage devices, then the storage locations of write buffer 32 will be organized into seven segment-columns, comprising six segment-columns into which data is stored and one segment-column into which parity information is stored. Thus, for an array of DASDs having N+1 storage devices, write buffer 32 will contain N data segment-columns and one parity segment-column.

Typically, write buffer 32 has a storage capacity of about one segment, so that the data in write buffer 32 and the parity segment-column computed from it together comprise approximately one segment's worth of information. When write buffer 32 becomes substantially full, LSA controller 30 computes the parity segment-column for the data in write buffer 32 and records the data and parity information into the next available empty segment mapped onto DASDs 28. In other words, the first segment-column of write buffer 32 is written into the first segment-column of the next available segment, the second segment-column of write buffer 32 is written into the second segment-column of the same next segment, the third segment-column of write buffer 32 is written into the third segment-column of the same next segment, and the process is repeated until the last segment-column is reached. LSA controller 30 keeps track of the next available empty segment for data recording and consults LSA directory 34 to determine the proper disk arm position for the empty segment.

Recording the contents in write buffer 32 into corresponding segment-columns of the same next empty disk segment avoids well-known write penalties associated with disk arm movement that would be incurred otherwise if each segment in write buffer 32 were written back to its original disk location each time a new data value must be recorded. In the configuration described above, for example, if the fourth segment were empty, then all the disk arms of all the DASDs would be swung to the fourth segment column. Writing into an empty disk segment also avoids the well-known write penalties associated with read-modify-write operations for data blocks and parity blocks in RAID-type data storage systems, which characterize most LSAs.

As the data values and parity value information (collectively referred to as data) are recorded into the disk storage locations, the new locations of the data values are maintained in LSA directory 34. At each new disk location of a segment, the valid information corresponding to each new data value is stored. Thereafter, if a single data record or block of the data file must be changed, the new data is written into write buffer 32 until one segment's worth of new data is accumulated in write buffer 32. The new segment is then stored into the disk locations, and LSA directory 34 is updated to indicate where the particular new data values may be found. In this way, write operations to the disk platters only need occur when an entire segment in write buffer 32 is to be recorded, rather than every time a new data value occurs. When a data value needs to be retrieved, LSA controller 30 consults LSA directory 34 to locate the data value.

A block that contains data values for which there have been later write operations, meaning that the data values have been superseded, is available for recording new data. Such superseded data is referred to as garbage (or "dead") and the corresponding disk area is referred to as a garbage block or garbage segment-column. A block containing data values that have not been superseded contains valid data and is referred to as a clean block or a live block. After a number of data-modifying write operations have been carried out in the storage devices forming an LSA, there likely will be at least one segment's worth of garbage blocks scattered throughout the LSA. A fully empty segment, which is available for receiving new (live) data values from write buffer 32, can be created by gathering these scattered garbage blocks together.

Creating empty segments is important because, for LSA controller 30 to continue its write operations as new data values are received from write buffer 32, new empty segments in the storage devices must be produced continually. New empty segments are typically produced by identifying clean blocks within segments containing live data and moving the live data from these segments to consolidate them in a smaller number of full segments. Such consolidation creates one or more segments that contain only garbage blocks. A segment that is entirely garbage is therefore empty and is available for recording one segment's worth of data from write buffer 32, as described above. The process of consolidating non-contiguous clean blocks so as to consolidate live data and form empty segments is called garbage collection. When the number of free segments drops below a threshold, garbage collection is initiated to generate new free segments.

Figure 3:
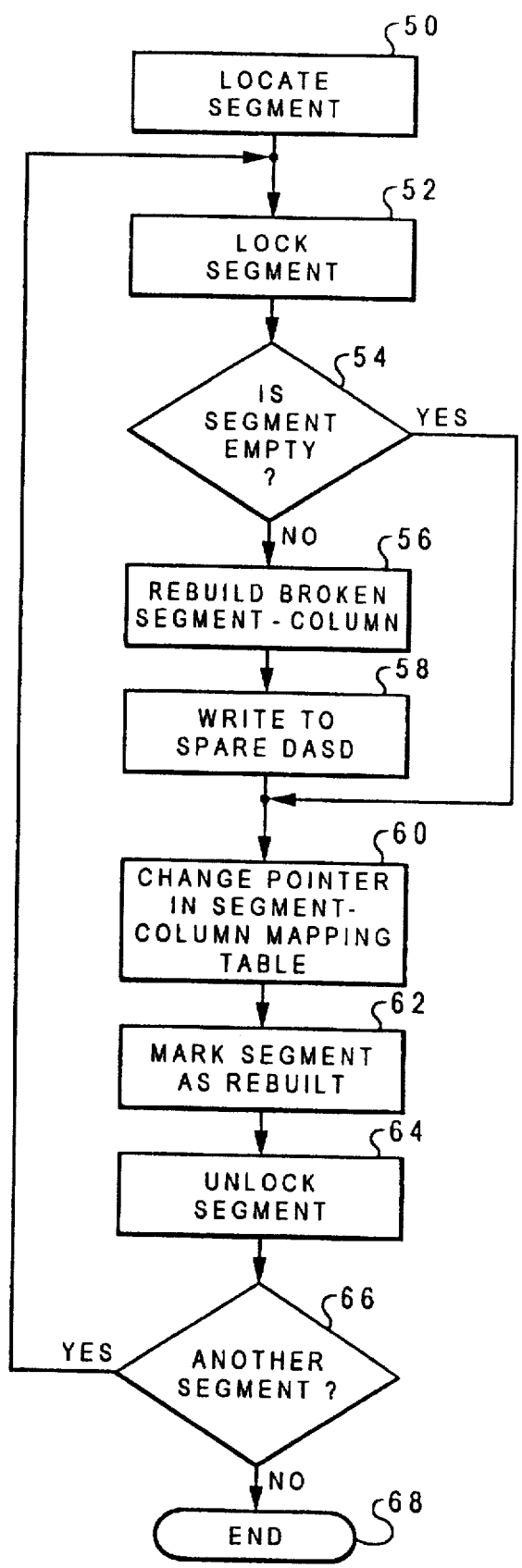
FIG. 3 is a high-level flow diagram of a method for rebuilding the contents of a malfunctioned direct access storage device within a logstructured array, according to a preferred embodiment of the invention.

Referring now to FIG. 3, there is illustrated a high-level flow diagram of a method for rebuilding the contents of a malfunctioned direct access storage device within a log-structured array, according to a preferred embodiment of the invention. Starting at block 50, a segment is first located, and the segment is locked to limit access only to this rebuilding process, as shown in block 52. A determination is then made as to whether or not the segment is empty, as depicted in block 54. If the segment is empty, the process then proceeds to block 60.

Otherwise, if the segment is not empty (at least one segment-column within the segment contains data or other information), then the segment-column in the malfunctioned direct access storage device is rebuilt by reading and XOR-ing the remaining segment-columns within the segment, and the result is written onto a segment-column in a spare direct access storage device within the same segment, as shown in blocks 56 and 58, respectively. Next, the pointer within the segment-column mapping table is moved from pointing to the segment-column in the malfunctioned direct access storage device to point to a segment-column in a spare direct access storage device within the same segment, as illustrated in block 60. Subsequently, the segment is marked as rebuilt and unlocked, as depicted in blocks 62 and 64, respectively.

Finally, a determination is made as to whether or not there is any other segment in the malfunctioned direct access storage device needed to be rebuilt, as illustrated in block 66. If there is another segment in the malfunctioned direct access storage device that needs to be rebuilt, the process returns back to block 52; otherwise, the process exits at block 68.

The sequence for rebuilding contents of a malfunctioned direct access storage device as described above, however, is not optimized for maximum efficiency. This is because it is possible that there is a large number of free segments present in the beginning of the rebuilding process. But these free segments could have become in use by the time the rebuilding process actually reaches that segment. As a result, the rebuilding process may still have to rebuild more segments than it needs to. Hence, in order to maximize the efficiency of the rebuilding process, an alternative method can be utilized. Instead of performing the rebuilding in a sequential or random manner, the alternative method finds all the free segments and changes the pointer locations for each of these free segments first, then proceeds to rebuild the remaining segments sequentially.

When utilizing the alternative method, those segments which are in-use at the beginning of the rebuilding process are most likely to still be in-use by the time the rebuilding process gets to those segments. However, it is possible that those segments may become free. Hence, an improved write algorithm may be utilized to take advantage of such situation. It is well-known in the art that the write algorithm is for writing data from the write buffer to one of the direct access storage devices when the write buffer is full and -that the write algorithm is processing concurrently with the rebuilding process.

Figure 4:
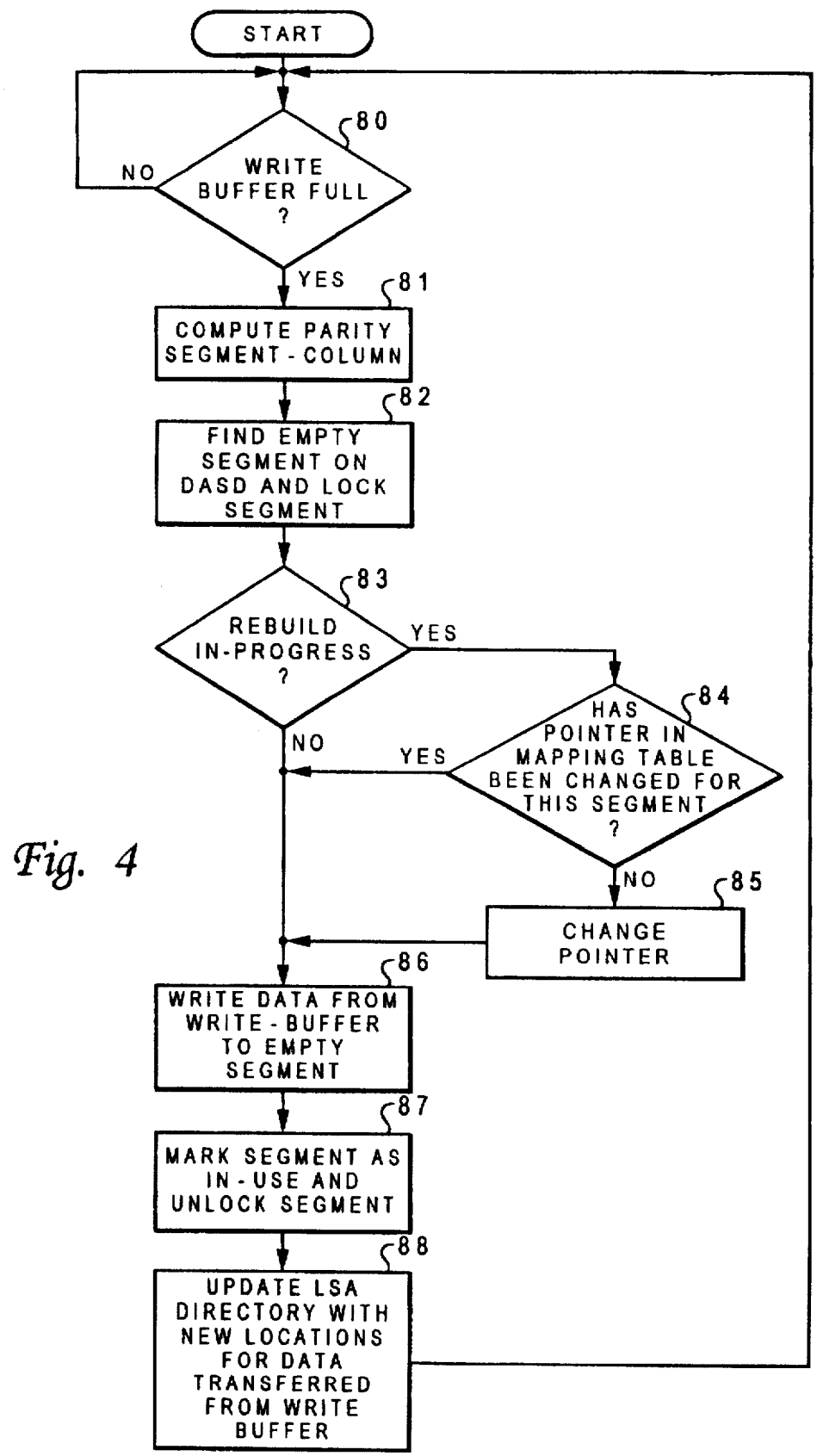
FIG. 4 is a high-level flow diagram of a write algorithm to be utilized in conjunction with the third method for rebuilding the contents of a malfunctioned direct access storage device within a log-structured array as described above, according to a preferred embodiment of the invention.

Referring now to FIG. 4, there is illustrated a high-level flow diagram of an improved write algorithm to be utilized in conjunction with the rebuilding process for the contents of a malfunctioned direct access storage device within a log-structured array as described above, according to a preferred embodiment of the invention. At the start, a determination is first made as to whether the write buffer is full or not, as shown in block 80. If the write buffer is not full, the process returns back to block 80. Otherwise, if the write buffer is full, the parity segment-column is computed, as depicted in block 81. Then, an empty segment is found within the direct access storage devices and the empty segment is locked, as shown in block 82. A determination is made as to whether or not there is a rebuild in progress, as depicted in block 83.

If there is a rebuild in progress, then another determination is made as to whether or not the pointer in the segment-column mapping table has been changed for this segment, as shown in block 84. If the pointer in the segment-column mapping table has been changed for this segment, the process proceeds to block 86. Otherwise, if the pointer in the segment-column mapping table has not been changed for this segment, then the pointer is changed, as shown in block 85. Subsequently, the data is written from the write buffer to the empty segment, as illustrated in block 86. Afterwards, the segment is marked as In-Use and the segment is unlocked, as depicted in block 87. Finally, the LSA directory is updated with new locations for data transferred from the write buffer, as shown in block 88, and the process returns back to block 80.

As has been described, the present invention provides an improved method and its alternative embodiment for rebuilding contents of a malfunctioned direct access storage device within a log-structured array. In addition, an improved write algorithm to be utilized in conjunction with the improved method or its alternative for further maximizing the rebuilding process is also disclosed.

While the invention has been particularly shown and described with reference to a preferred embodiment, it will be understood by those skilled in the art that various changes in form and detail may be made therein without departing from the spirit and scope of the invention.

What is claimed is:

1. A method for rebuilding contents of a malfunctioned direct access storage device within a plurality of direct access storage devices forming a log-structured array, wherein each direct access storage device within said log-structured array is divided into a plurality of segment-columns and each corresponding one of said plurality of segment-columns from all direct access storage devices within said log-structured array constitutes a segment, said method comprising the steps of:

locating all empty segments within said direct access storage devices;

moving a pointer within a segment-column mapping table from pointing to a segment-column in said malfunctioned direct access storage device to point to a segment-column in a spare direct access storage device of each of said located empty segments;

locating a segment within said direct access storage devices;

determining whether or not said segment is empty;

in response to a determination that said segment is empty, moving a pointer within a segment-column mapping table from pointing to a segment-column in said malfunctioned direct access storage device to point to a segment-column in a spare direct access storage device of said segment;

in response to a determination that said segment is not empty, rebuilding contents of said segment-column in said malfunctioned direct access storage device to said segment-column in said spare direct access storage device, and moving said pointer within said segment-column mapping table from pointing to said segment-column in said malfunctioned direct access storage device to point to said segment-column in said spare direct access storage device of said segment; and returning to said determining step until all segment-columns within said malfunctioned direct access are rebuilt.

2. The method for rebuilding contents of a malfunctioned direct access storage device within a log-structured array according to claim 1, wherein the step of rebuilding further includes locking segment before rebuilding and unlocking segment after rebuilding.

3. The method for rebuilding contents of a malfunctioned direct access storage device within a log-structured array according to claim 1, wherein the step of rebuilding further includes reading, XORing, and writing contents to a segment-column of a spare storage device.

4. The method for rebuilding contents of a malfunctioned direct access storage device within a log-structured array according to claim 1, wherein the step of rebuilding further includes marking segment as rebuilt.

5. The method for rebuilding contents of a malfunctioned direct access storage device within a log-structured array according to claim 1, wherein a write process is executing concurrently with said method, wherein said write process writes data from a write buffer to one of said direct access storage devices when said write buffer is full, wherein said write process moves a pointer within said segment-column mapping table to point to a segment-column in said spare direct access storage device before said data writing.

6. A computer program product residing on a computer usable medium for efficiently rebuilding contents of a malfunctioned direct access storage device within a plurality of direct access storage devices forming a log-structured array, wherein each direct access storage device within said log-structured array is divided into a plurality of segment-columns and each corresponding one of said plurality of segment-columns from all direct access storage devices within said log-structured array constitutes a segment, said computer product comprising:

program code means for locating all empty segments within said direct access storage devices;

program code means for moving a pointer within a segment-column mapping table from pointing to a segment-column in said malfunctioned direct access storage device to point to a segment-column in a spare direct access storage device of each of said located empty segments;

program code means for locating a segment within said direct access storage devices;

program code means for determining whether or not said segment is empty;

program code means for moving a pointer within a segment-column mapping table from pointing to a segment-column in said malfunctioned direct access storage device to point to a segment-column in a spare direct access storage device of said segment, in response to a determination that said segment is empty;

program code means for rebuilding contents of said segment-column in said malfunctioned direct access storage device to said segment-column in said spare direct access storage device, and moving said pointer within said segment-column mapping table from pointing to said segment-column in said malfunctioned direct access storage device to point to said segment-column in said spare direct access storage device of said segment, in response to a determination that said segment is not empty.

* * * * *